United States Patent
Chen

(10) Patent No.: US 10,715,282 B2
(45) Date of Patent: Jul. 14, 2020

(54) METHOD AND RELATED DEVICE FOR IMPROVING TCP TRANSMISSION EFFICIENCY USING DELAYED ACK

(71) Applicant: HUAWEI TECHNOLOGIES CO., LTD., Shenzhen, Guangdong (CN)

(72) Inventor: Guohai Chen, Nanjing (CN)

(73) Assignee: HUAWEI TECHNOLOGIES CO., LTD., Shenzhen, Guangdong (CN)

(*) Notice: Subject to any disclaimer, the term of this patent is extended or adjusted under 35 U.S.C. 154(b) by 0 days.

(21) Appl. No.: 16/038,112

(22) Filed: Jul. 17, 2018

(65) Prior Publication Data

US 2018/0323913 A1 Nov. 8, 2018

Related U.S. Application Data

(63) Continuation of application No. PCT/CN2017/071259, filed on Jan. 16, 2017.

(30) Foreign Application Priority Data

Jan. 18, 2016 (CN) .......................... 2016 1 0031363

(51) Int. Cl.
*H04L 1/18* (2006.01)
*H04L 29/06* (2006.01)
(Continued)

(52) U.S. Cl.
CPC .......... *H04L 1/1887* (2013.01); *H04L 1/1825* (2013.01); *H04L 1/1854* (2013.01);
(Continued)

(58) Field of Classification Search
CPC ... H04L 1/1887; H04L 1/1825; H04L 5/0055; H04L 29/06
See application file for complete search history.

(56) References Cited

U.S. PATENT DOCUMENTS

| 7,551,621 B1* | 6/2009 | Hedge ..................... H04L 47/10 370/235 |
| 2003/0126238 A1 | 7/2003 | Kohno et al. |

(Continued)

FOREIGN PATENT DOCUMENTS

| CN | 101924625 A | 12/2010 |
| CN | 102355462 A | 2/2012 |

(Continued)

OTHER PUBLICATIONS

D. Borman et al, TCP Extensions for High Performance. RFC7323, Sep. 2014, 49 pages.
(Continued)

*Primary Examiner* — Hassan Kizou
*Assistant Examiner* — Deepa Belur
(74) *Attorney, Agent, or Firm* — Womble Bond Dickinson (US) LLP

(57) ABSTRACT

A data transmission method and a device are provided. A receive end receives, using a first protocol, K packets sent by a transmit end, determines a second sending delay based on a target packet when detecting that the target packet is lost; sends an ACK message to the transmit end by using the first protocol based on the second sending delay, where the ACK message is used to notify the transmit end that the receive end has received all packets sent by the transmit end; sends a retransmission request for the target packet to the transmit end by using a second protocol, and receives, by using the second protocol, the target packet retransmitted by the transmit end. The method ensures high and stable throughputs, and lowers a memory requirement compared with an improved technology that uses TCP streams to transmit data, thereby saving system resources.

21 Claims, 7 Drawing Sheets

(51) Int. Cl.
  *H04L 5/00* (2006.01)
  *H04L 12/823* (2013.01)
(52) U.S. Cl.
  CPC ............ *H04L 5/0055* (2013.01); *H04L 29/06*
  (2013.01); *H04L 47/32* (2013.01)

(56) References Cited

U.S. PATENT DOCUMENTS

| | | | |
|---|---|---|---|
| 2003/0206521 A1* | 11/2003 | Qiao | ........................ H04L 45/00 |
| | | | 370/230 |
| 2003/0227875 A1 | 12/2003 | Wei et al. | |
| 2005/0111456 A1 | 5/2005 | Inazumi | |
| 2005/0198350 A1* | 9/2005 | Tan | .......................... H04L 69/16 |
| | | | 709/232 |
| 2005/0204247 A1 | 9/2005 | Guo et al. | |
| 2006/0133273 A1 | 6/2006 | Julian et al. | |
| 2007/0133418 A1* | 6/2007 | Agarwal | ............... H04W 80/06 |
| | | | 370/236 |
| 2010/0118722 A1* | 5/2010 | Lu | ............................. H04J 3/24 |
| | | | 370/252 |
| 2012/0218914 A1 | 8/2012 | Tanaka et al. | |
| 2013/0235843 A1* | 9/2013 | Gohari | .................. H04W 80/06 |
| | | | 370/331 |
| 2014/0129893 A1 | 5/2014 | Rigaudeau et al. | |
| 2016/0323062 A1* | 11/2016 | Yang | ................... H03M 13/154 |

FOREIGN PATENT DOCUMENTS

| | | |
|---|---|---|
| JP | 2003-224547 A | 8/2003 |
| JP | 2005-143076 A | 6/2005 |
| JP | 2005-529546 A | 9/2005 |
| JP | 2012-182551 A | 9/2012 |
| WO | 2015/142748 A1 | 9/2015 |

OTHER PUBLICATIONS

Geoff Huston, Telstra, TCP Performance—The Internet Protocol Journal—vol. 3, No. 2, Jun. 2000, 13 pages.

* cited by examiner

METHOD AND RELATED DEVICE FOR IMPROVING TCP TRANSMISSION EFFICIENCY USING DELAYED ACK

CROSS-REFERENCE TO RELATED APPLICATIONS

This application is a continuation of International Application No. PCT/CN2017/071259, filed on Jan. 16, 2017, which claims priority to Chinese Patent Application No. 201610031363.0, filed on Jan. 18, 2016. The disclosures of the aforementioned applications are hereby incorporated by reference in their entireties.

TECHNICAL FIELD

Embodiments of the present invention relate to the field of communications technologies, and in particular, to a data transmission method and a related device.

BACKGROUND

It is well known that a big data technology relates to all aspects including data collection, transmission, processing, and management. Data transmission means that big data is transferred from one organization to another and is usually transmitted by using the File Transfer Protocol (FTP). The FTP is based on the Transmission Control Protocol (TCP) to implement data transmission. Throughputs are often affected by many factors when the TCP is used to transmit data, such as a packet loss rate and a round trip time (RTT). For 100 GB data, if a transmission rate is 1.32 Mbps (megabit per second), seven days are required for completing transmission; or if a transmission rate is 0.31 Mbps, 30 days are required for completing transmission.

Currently, for low TCP transmission performance of big data, there are many new technologies to improve transmission efficiency of big data. For example, the grid File Transfer Protocol (Grid FTP) is used. This technology is used to establish a number of TCP streams between a transmit end and a receive end to transmit data. The transmit end distributes the data to the TCP streams, and then the receive end combines the data from the TCP streams. When a packet loss caused by congestion occurs on one or more TCP streams, the transmit end halves a congestion window based on an acknowledgement (ACK) message returned from the receive end, thereby resulting in a decrease in throughputs. However, because there are the TCP streams to simultaneously transmit data, impact on average throughputs is relatively small when data transmission fails on a small quantity of TCP streams, thereby ensuring TCP transmission performance.

However, although data transmission throughputs of big data can be ensured using the foregoing solution, a number of TCP connections need to be established. If 20 TCP streams are used for calculation, and each TCP stream occupies 20 M memory, 400 M memory is required for transmitting one group of data. If a number of groups of data are simultaneously transmitted, and there are memory overheads of another application of a system, system memory becomes a bottleneck of data transmission.

SUMMARY

Embodiments of the present invention provide a data transmission method and a related device, so that a transmit end can be effectively prevented from decreasing a TCP congestion window. In this way, there is no need to use multiple TCP streams to transmit data to ensure throughputs. This solution can not only ensure that the throughputs are high enough and stable, but also greatly lower a memory requirement compared with an improved technology that uses the TCP streams to transmit data, thereby saving system resources.

In view of this, a first aspect of the present invention provides a data transmission method, including:

receiving, by a receive end by using a first protocol, K packets sent by a transmit end, where each packet includes a sequence number, and the K packets are some of L packets sent by the transmit end;

determining, by the receive end, a second sending delay based on a target packet when the receive end detects that the target packet is lost by using the first protocol based on sequence numbers in the K packets, where in one embodiment of the present invention, the second sending delay is greater than a first sending delay, and the first sending delay is manually preset;

sending, by the receive end, an acknowledgement (ACK) message to the transmit end by using the first protocol based on the second sending delay, where the ACK message is used to notify the transmit end of such a message, that is, "the receive end currently has received the L packets";

sending, by the receive end, a retransmission request for the target packet to the transmit end by using a second protocol, so that the transmit end can send the lost target packet based on the retransmission request; and receiving, by the receive end by using the second protocol, the target packet retransmitted by the transmit end, where however, alternatively, the receive end may send the ACK message to the transmit end by using the first protocol based on the second sending delay after receiving, by using the second protocol, the target packet retransmitted by the transmit end, so as to complete data transmission.

An embodiment of the present invention provides the data transmission method that may be applied to a big data scenario. The receive end receives, by using the first protocol, the K packets sent by the transmit end, where each packet includes a sequence number, and the K packets are a subset of the L packets sent by the transmit end. The receive end determines the second sending delay based on the target packet when detecting that the target packet is lost by using the first protocol based on the sequence numbers in the K packets, where the second sending delay is greater than the first sending delay, and the first sending delay is preset. The receive end sends the ACK message to the transmit end by using the first protocol based on the second sending delay, where the ACK message is used to notify the transmit end that the receive end has received the L packets. The receive end sends the retransmission request for the target packet to the transmit end by using the second protocol, and receives, by using the second protocol, the target packet retransmitted by the transmit end. The foregoing method is used for data transmission, so that the transmit end can be effectively prevented from decreasing a TCP congestion window. In this way, there is no need to use multiple TCP streams to transmit data to ensure throughputs. This solution can not only ensure that the throughputs are high enough and stable, but also greatly lower a memory requirement compared with an improved technology that uses the TCP streams to transmit data, thereby saving system resources.

In one embodiment, before the determining, by the receive end, a second sending delay based on a target packet, the method may further include:

determining, by the receive end, whether a sequence number corresponding to the last byte of a first packet in the K packets is continuous with a sequence number corresponding to the first byte of a second packet in the K packets, where the first packet is received before the second packet, that is, the first packet is a previous packet of the second packet or is N packets prior to the second packet, and N is a positive integer greater than or equal to 1; and determining, by the receive end, that no packet is lost if the sequence number corresponding to the last byte of the first packet is continuous with the sequence number corresponding to the first byte of the second packet; or determining, by the receive end, that at least one packet is lost if the sequence number corresponding to the last byte of the first packet is not continuous with the sequence number corresponding to the first byte of the second packet, where the at least one lost packet is the target packet.

In addition, a method for determining whether a packet is lost is provided in the embodiments of the present invention. It may be determined whether a packet is lost by determining whether the sequence number corresponding to the last byte of the first packet in the packets is continuous with the sequence number corresponding to the first byte of the second packet in the packets. The lost packet is determined by using the foregoing method. If no packet is lost, there is no need to increase the second sending delay. If it is determined that a target packet is lost by using the foregoing method, the second sending delay may be further increased. Therefore, it may be more accurately learned, by determining whether the target packet is lost, whether the second sending delay needs to be increased, so as to improve feasibility and practicality of the solution.

In one embodiment, before the sending, by the receive end, a retransmission request for the target packet to the transmit end by using a second protocol, the method may further include:

sending, by the receive end, information about the target packet to the second protocol at the receive end by using the first protocol, where the information about the target packet may include at least a length and/or an offset of the target packet, the offset refers to an offset location of the lost packet in an entire data stream, and the length refers to a quantity of bytes in the packet.

In addition, a relationship between the first protocol and the second protocol is described in the embodiments of the present invention. Data exchange is performed between the first protocol and the second protocol at the receive end or the transmit end. The first protocol mainly implements that sending of the ACK message can be delayed in a case of a packet loss, and the second protocol is used between the transmit end and the receive end to complete effective data transmission in a cooperation manner, and is responsible for retransmission of the lost packet. The newly-added second protocol plays a role in improving packet retransmission efficiency in an actual application process, and the data exchange between the first protocol and the second protocol provides support for specific implementation of the solution of the present invention, thereby improving feasibility and practicality of the solution.

In one embodiment, after the determining, by the receive end, that at least one packet is lost, the method may further include:

determining a location of the target packet in the entire data stream by using the second protocol based on an initial sequence number obtained by using the first protocol, the sequence number corresponding to the last byte of the first packet, and the sequence number corresponding to the first byte of the second packet.

In addition, in the embodiments of the present invention, the receive end may send the information to a second protocol layer of the second protocol by a first protocol layer of the first protocol based on the initial sequence number, the sequence number corresponding to the last byte of the first packet, and the sequence number corresponding to the first byte of the second packet, so that the receive end determines the location of the target packet in the entire to-be-sent data stream by using the second protocol. Therefore, the solution is more feasible, and is more practical and flexible.

In one embodiment, the determining, by the receive end, a location of the target packet by using the second protocol based on an initial sequence number obtained by using the first protocol, the sequence number corresponding to the last byte of the first packet, and the sequence number corresponding to the first byte of the second packet may include:

calculating, by the receive end, a sequence number corresponding to the first byte of the target packet based on a formula $M=A+1$, where M is the first byte corresponding to the target packet, and A is the sequence number corresponding to the last byte of the first packet;

calculating, by the receive end, a length of the target packet based on a formula $N=B-A-1$, where N is the length of the target packet, B is the sequence number corresponding to the first byte of the second packet; and calculating, by the receive end, an offset location of the target packet based on a formula $Q=A-Y$, where Q is the offset location of the target packet, and Y is the initial sequence number.

Further, how to determine the location of the target packet by using the second protocol is described in the embodiments of the present invention. The receive end may calculate the first byte corresponding to the target packet, the length of the target packet, and the offset location of the target packet based on related formulas, so as to determine the location of the target packet, thereby providing a specific basis for implementation of the solution, and improving feasibility of the solution.

In one embodiment, after the determining, by the receive end, a second sending delay based on a target packet, the method may further include:

starting, by the receive end, a counter;

each time receiving one packet, needing, by the receive end, to determine whether a packet loss occurs; and if a packet is lost, resetting the counter, and increasing the second sending delay, or if no packet is lost, increasing a value of the counter, and further determining whether the value of the counter reaches a preset threshold; and if the value of the counter reaches the preset threshold, decreasing the second sending delay, and resetting the counter.

Still further, in the embodiments of the present invention, the receive end may control the second sending delay based on an actual situation. The receive end increases the second sending delay when determining that a packet is lost, so as to avoid a problem that because the receive end sends an ACK message to the transmit end once detecting a packet loss, a congestion window at the transmit end is halved. The receive end decreases the second sending delay when determining that no packet is lost, so that the transmit end can learn of a receiving status of the receive end in a more timely manner. In this way, because the congestion window at the transmit end is not suddenly decreased, throughputs can be ensured when the TCP is used to transmit data. In addition, the receive end controls the second sending delay by using a method for calculating a quantity of packets by using the counter, so that feasibility and flexibility of the solution can be improved.

A second aspect of the present invention provides a receive end, including:

a receiving module, configured to receive, by using a first protocol, K packets sent by a transmit end, where each packet includes a sequence number, and the K packets are a subset of L packets sent by the transmit end;

a determining module, configured to determine a second sending delay based on a target packet when detecting that the target packet is lost by using the first protocol based on sequence numbers in the K packets received by the receiving module, where the second sending delay is greater than a first sending delay, and the first sending delay is preset; and a sending module, configured to send an ACK message to the transmit end by using the first protocol based on the second sending delay determined by the determining module, where the ACK message is used to notify the transmit end that the receive end has received the L packets, where the sending module is further configured to send a retransmission request for the target packet to the transmit end by using a second protocol when the determining module detects that the target packet is lost by using the first protocol based on the sequence numbers in the K packets; and the receiving module is further configured to: after the sending module sends the retransmission request for the target packet to the transmit end by using the second protocol, receive, by using the second protocol, the target packet retransmitted by the transmit end.

In one embodiment, the receive end may further include a judgment module, where the judgment module is configured to: before the determining module determines a sending delay based on the target packet, determine whether a sequence number corresponding to the last byte of a first packet in the K packets is continuous with a sequence number corresponding to the first byte of a second packet in the K packets, where the first packet is received before the second packet; and the determining module is further configured to: determine that no packet is lost if the judgment module determines that the sequence number corresponding to the last byte of the first packet is continuous with the sequence number corresponding to the first byte of the second packet; or determine that at least one packet is lost if the judgment module determines that the sequence number corresponding to the last byte of the first packet is not continuous with the sequence number corresponding to the first byte of the second packet, where the at least one packet is the target packet.

In one embodiment, the sending module is further configured to: before the sending module sends the retransmission request for the target packet to the transmit end by using the second protocol, send information about the target packet to a second protocol layer of the second protocol from a first protocol layer of the first protocol.

In one embodiment, the determining module is further configured to: after the determining module determines that the at least one packet is lost, determine a location of the target packet by using the second protocol based on an initial sequence number of the first protocol, the sequence number corresponding to the last byte of the first packet, and the sequence number corresponding to the first byte of the second packet.

In one embodiment, the determining module includes:

a calculation unit, configured to: calculate the first byte corresponding to the target packet based on a formula $M=A+1$, where $M$ is a sequence number corresponding to the first byte of the target packet, and $A$ is the sequence number corresponding to the last byte of the first packet;

calculate a length of the target packet based on a formula $N=B-A-1$, where $N$ is the length of the target packet, $B$ is the sequence number corresponding to the first byte of the second packet; and calculate a location of the target packet based on a formula $Q=A-Y$, where $Q$ is the location of the target packet, and $Y$ is the initial sequence number.

In one embodiment, the receive end further includes a start module and a counting module, where the start module is configured to start a counter after the determining module determines the second sending delay based on the target packet; and the counting module is configured to: after the start module starts the counter, each time one packet is received, determine whether a packet loss occurs; and if a packet is lost, reset the counter, and increase the second sending delay, or if no packet is lost, increase a value of the counter, and determine whether the value of the counter reaches a preset threshold; and if the value of the counter reaches the preset threshold, decrease the second sending delay, and reset the counter.

A third aspect of the present invention provides a receive end, including a memory, a transceiver, a processor, and a bus system, where the memory is configured to store a program; and the processor is configured to execute the program in the memory, and specific steps are as follows:

controlling the transceiver to receive, by using a first protocol, K packets sent by a transmit end, where each packet includes a sequence number, and the K packets are some of L packets sent by the transmit end;

determining a second sending delay based on a target packet when it is detected that the target packet is lost by using the first protocol based on sequence numbers in the K packets, where the second sending delay is greater than a first sending delay, and the first sending delay is preset;

controlling the transceiver to send an acknowledgement ACK message to the transmit end by using the first protocol based on the second sending delay, where the acknowledgement ACK message is used to notify the transmit end that the receive end has received the L packets;

controlling the transceiver to send a retransmission request for the target packet to the transmit end by using a second protocol; and controlling the transceiver to receive, by using the second protocol, the target packet retransmitted by the transmit end.

Optionally, the processor is configured to execute the program in the memory, and is further specifically configured to perform the following operations:

determining whether a sequence number corresponding to the last byte of a first packet in the K packets is continuous with a sequence number corresponding to the first byte of a second packet in the K packets, where the first packet is received before the second packet; and determining that no packet is lost if the sequence number corresponding to the last byte of the first packet is continuous with the sequence number corresponding to the first byte of the second packet; or determining that at least one packet is lost if the sequence number corresponding to the last byte of the first packet is not continuous with the sequence number corresponding to the first byte of the second packet, where the at least one packet is the target packet.

Optionally, the processor is configured to execute the program in the memory, and is further configured to perform the following operations:

controlling the transceiver to send information about the target packet to a second protocol layer associated with the second protocol via a first protocol layer using the first protocol.

Optionally, the processor is configured to execute the program in the memory, and is further configured to perform the following operations:

determining a location of the target packet by using the second protocol based on an initial sequence number of the first protocol, the sequence number corresponding to the last byte of the first packet, and the sequence number corresponding to the first byte of the second packet.

Optionally, the processor is configured to execute the program in the memory, and is further configured to perform the following operations:

calculating a sequence number corresponding to the first byte of the target packet based on a formula M=A+1, where M is the first byte corresponding to the target packet, and A is the sequence number corresponding to the last byte of the first packet;

calculating a length of the target packet based on a formula N=B−A−1, where

N is the length of the target packet, B is the sequence number corresponding to the first byte of the second packet; and calculating an offset location of the target packet based on a formula Q=A−Y, where Q is the offset location of the target packet, and Y is the initial sequence number.

Optionally, the processor is configured to execute the program in the memory, and is further configured to perform the following operations:

starting a counter; and each time one packet is received, determining whether a packet loss occurs; and if a packet is lost, resetting the counter, and increasing the second sending delay, or if no packet is lost, increasing a value of the counter, and determining whether the value of the counter reaches a preset threshold; and if the value of the counter reaches the preset threshold, decreasing the second sending delay, and resetting the counter.

It may be learned from the foregoing technical solutions that the embodiments of the present invention have the following advantages:

Embodiments of the present invention provide the data transmission method that may be applied to a big data scenario. The receive end receives, by using the first protocol, the K packets sent by the transmit end, where each packet includes a sequence number, and the K packets are some of the L packets sent by the transmit end. The receive end determines the second sending delay based on the target packet when detecting that the target packet is lost by using the first protocol based on the sequence numbers in the K packets, where the second sending delay is greater than the first sending delay, and the first sending delay is preset. The receive end sends the ACK message to the transmit end by using the first protocol based on the second sending delay, where the ACK message is used to notify the transmit end that the receive end has received the L packets. The receive end sends the retransmission request for the target packet to the transmit end by using the second protocol, and receives, by using the second protocol, the target packet retransmitted by the transmit end. The foregoing method is used for data transmission, so that the transmit end can be effectively prevented from decreasing a TCP congestion window. In this way, there is no need to use multiple TCP streams to transmit data to ensure throughputs. The solutions can not only ensure that the throughputs are high enough and stable, but also greatly lower a memory requirement compared with an improved technology that uses the TCP streams to transmit data, thereby saving system resources.

DESCRIPTION OF EMBODIMENTS

Figure 1:
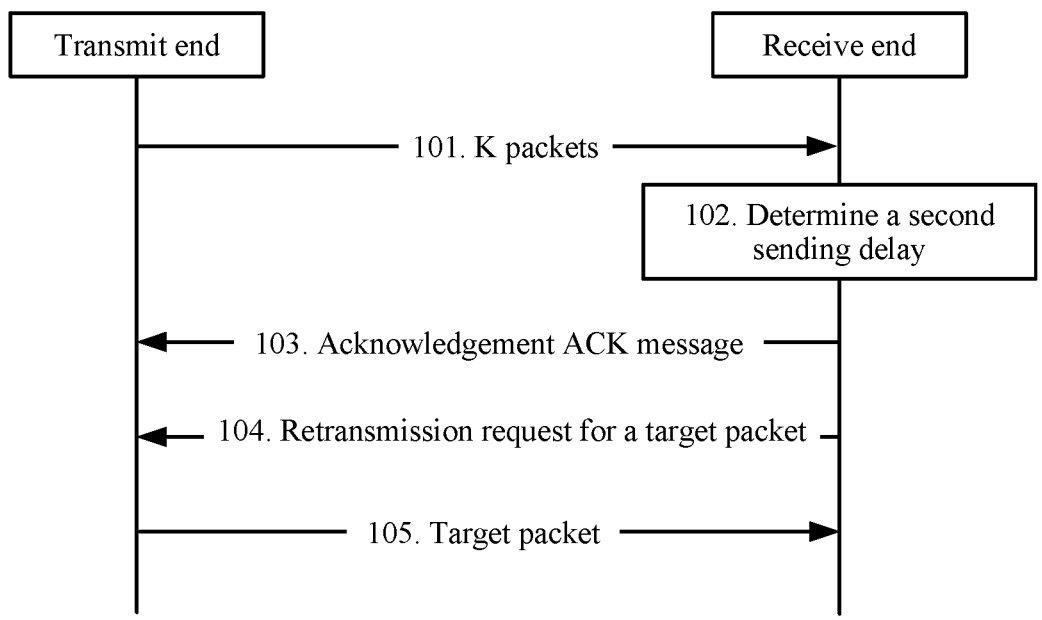
FIG. 1 is a schematic diagram of an embodiment of a data transmission method according to an embodiment of the present invention.

The present invention provides a data transmission method and a related device, so that a transmit end can be effectively prevented from decreasing a TCP congestion window. In this way, there is no need to use multiple TCP streams to transmit data to ensure throughputs. This solution can not only ensure that the throughputs are high enough and stable, but also greatly lower a memory requirement compared with an improved technology that uses the TCP streams to transmit data, thereby saving system resources.

In the specification, claims, and accompanying drawings of the present invention, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments of the present invention described herein can be implemented in orders except the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

It should be understood that the embodiments of the present invention may be applied to data transmission in a big data scenario, but is not limited to only the big data scenario. In an information technology (IT), big data attracts increasing attention because big data has the following four features: A first feature is a large amount of data, which basically refers to a magnitude from tens of terabytes (TB) to petabytes (PB), and even to exabytes (EB). A second feature is a diversity of data. In addition to conventional sales and inventory data, data that is currently collected and analyzed by an enterprise includes text data in media such as web log data and social platform data, location information generated in a Global Positioning System (GPS) built in a smartphone, video data of a surveillance camera, and the like. A third feature is a high data generation speed and update frequency, and strong real-timeness. A fourth feature is high value. An advantage of big data is that data is useful and is of high value. For many industries, how to fully use big data becomes a key to a success of competition.

Generally, the FTP may be used to transmit big data. The FTP is used to control bidirectional transfer of a file on the Internet, and the FTP is also an application program. There are different FTP application programs depending on different operating systems, and all these application programs comply with a same protocol to transfer the file. During use of the FTP, two concepts often arise: downloading and uploading. Downloading a file refers to copying the file from a remote host to your own computer, and uploading a file refers to copying the file from your own computer to the remote host.

It is learned from the foregoing description that the FTP may be an application program that controls bidirectional transfer of the file on the Internet. However, the FTP is actually based on the TCP to implement a data transmission function. The TCP is a connection-oriented, reliable, and byte stream-based transport layer communications protocol, and is defined by the Request for Comments (RFC) 793 of the Internet Engineering Task Force (IETF). In a simplified computer network Open System Interconnection (OSI) model, the TCP is used to complete a function specified by the fourth layer, that is, a transport layer. An application layer sends, to a TCP layer, a data stream used for inter-network transmission and represented by an 8-bit byte, and then the TCP layer encapsulates the data stream into a packet, and transmits the packet to a TCP layer at a receive end by using a network. Each packet encapsulated by the TCP layer includes a sequence number corresponding to the first byte of the packet, and each subsequent byte is incremented based on the sequence number of the first byte. When sequence numbers corresponding to bytes are not continuous, a packet loss may be detected. In a packet transmission process, a receive end returns a corresponding ACK message for a successfully received packet. If a transmit end does not receive an ACK corresponding to a packet within a proper RTT, it is assumed that the packet is lost, and the packet is retransmitted.

It should be understood that the data transmission method provided in the embodiments of the present invention may be applied to a network device, or may be applied to a terminal device. A specific deployment scenario is not limited herein.

Referring to FIG. 1, an embodiment of a data transmission method in an embodiment of the present invention includes the following operations.

Operation 101. Receive, by a receive end using a first protocol, K packets sent by a transmit end, where each packet includes a sequence number, and the K packets are a subset of L packets sent by the transmit end.

In this embodiment, a receive end receives, by using the first protocol, the K packets sent by the transmit end, and each packet includes a sequence number. K is a natural number greater than or equal to 1, and L is a natural number greater than or equal to K.

The first protocol is a protocol obtained after a conventional TCP protocol is modified, and is referred to as a modified TCP, or may be referred to as an extended TCP in this specification. Different from the conventional TCP, the modified TCP (e.g., the first protocol) is used for delay sending of an ACK message based on a packet loss status, and the first protocol, namely, the modified TCP is not used to retransmit the packet. In the present invention, the receive end and the transmit end establish a TCP connection by using the conventional TCP, so that the receive end can receive, by using the first protocol, the packet sent by the transmit end.

Each byte of each packet is corresponding to one sequence number. A sequence number of the first byte of the first packet may be denoted as x, a sequence number of the second byte of the first packet following the first byte of the first packet is x+1, and so on, where x is a positive integer greater than or equal to 0. If a sequence number of the last byte of the first packet is y, a sequence number of the first byte of the second packet is y+1, where y is a positive integer greater than or equal to 0.

Operation 102. The receive end determines a second sending delay based on a target packet when it is detected that the target packet is lost by using the first protocol based on sequence numbers in the K packets, where the second sending delay is greater than a first sending delay, and the first sending delay is preset.

In this embodiment, when detecting that the target packet is lost by using the first protocol based on the sequence numbers in the K packets, the receive end determines the second sending delay based on at least one of the following information: a quantity of target packets in an entire data sequence, lengths of target packets in an entire data sequence, and offset locations of target packets in an entire data sequence. The second sending delay is time delayed for sending an acknowledgement ACK message to the transmit end by the receive end. The target packet is at least one of the L packets.

The second sending delay is greater than the first sending delay. To be specific, if the preset first sending delay is 8 milliseconds (ms), the receive end sends an ACK message to the transmit end every 8 ms, so as to notify the transmit end which packets are received within the 8 ms. If it is found that a target packet is lost within 8 ms, the first sending delay of 8 ms is prolonged, for example, a delay value may be increased. The delay value may be a fixed value or a value with a specific rule. If the delay value is 20 ms, an obtained second sending delay is 28 ms, and the second sending delay is definitely greater than the first sending delay. If the second sending delay is 28 ms, when 8 ms passes, the receive end does not notify the transmit end that the receive end does not receive target packets, "conceals" a packet loss status, and attempts to receive these lost target packets again in subsequent 20 ms. After receiving the lost target packets by using the first protocol, the receive end notifies, by using an acknowledgement ACK message, the transmit end that all the packets have been received. In this way, the transmit end is prevented from fast decreasing a TCP congestion window because the transmit end finds that the packets are lost, and the transmit end is also prevented from fast decreasing a sending rate.

Operation 103. The receive end sends an ACK message to the transmit end by using the first protocol based on the second sending delay, where the acknowledgement ACK message is used to notify the transmit end that a receive end has received the L packets.

In this embodiment, the receive end sends the ACK message to the transmit end by using the first protocol based on the second sending delay, where the ACK message is used to notify the transmit end that the receive end has received the L packets, that is, notify the transmit end that no packet is lost.

It should be noted that operation 103 and operation 105 in which the receive end receives the retransmitted target packet by using a second protocol are not performed in sequence. To be specific, operation 103 in which the receive end sends the ACK message to the transmit end by using the first protocol based on the sending delay may be before operation 105 in which the receive end receives, by using the second protocol, the target packet retransmitted by the transmit end, or may be after operation 105 in which the receive end receives, by using the second protocol, the target packet retransmitted by the transmit end.

Operation 104. The transmit end sends a retransmission request for the target packet to the transmit end by using a second protocol.

In this embodiment, the receive end sends the retransmission request for the target packet to the transmit end by using the second protocol, so as to request the transmit end to retransmit the target packet.

The second protocol may be another modified TCP, and the modified TCP is referred to as a quasi-TCP protocol and is applied to a TCP quasi-application layer. Different from the conventional TCP, the second protocol can be used to receive related information about the target packet that is sent by using the first protocol, and the second protocol can be used to retransmit the target packet.

In addition, the second protocol may be a modified user datagram protocol (UDP). A conventional UDP is a connectionless transport layer protocol in an OSI reference model, and is used to provide a transaction-oriented, simple, and unreliable information transfer service. In a network, the conventional UDP as well as the TCP protocol is used to process a packet, and is a connectionless protocol. The UDP has disadvantages of not providing packet grouping, assembly, and packet sorting. To be specific, after a packet is sent, it cannot be learned whether the packet arrives securely and completely. The UDP is used to support those network applications that need to transmit data between computers.

Data transmission between Internet Protocol (IP) layers is unreliable. A TCP layer is established above an unreliable IP layer and provides reliable transmission. A quasi-TCP layer is established at an upper layer of the TCP layer. The receive end sends, by using a TCP quasi-application layer that uses the second protocol, the retransmission request to a TCP quasi-application layer that uses the second protocol and that is at the transmit end, so that the transmit end retransmits the target packet based on the received retransmission request.

Operation 105. The receive end receives, using the second protocol, the target packet retransmitted by the transmit end.

In this embodiment, after receiving, by using the second protocol, the retransmission request sent by the receive end, the transmit end retransmits the lost target packet to the receive end by using the second protocol based on the request, and the receive end receives the corresponding target packet by using the second protocol.

It should be noted that the receive end may send the acknowledgement ACK message to the transmit end by using the first protocol based on the second sending delay after receiving, by using the second protocol, the target packet retransmitted by the transmit end. This is not limited herein.

The present invention provides the data transmission method that may be applied to a big data scenario. The receive end receives, by using the first protocol (e.g., a modified TCP peer protocol modified from a conventional TCP protocol), the K packets sent by the transmit end, where each packet includes a sequence number, and the K packets are some of the L packets sent by the transmit end. The receive end determines the second sending delay based on the target packet when detecting that the target packet is lost by using the first protocol based on the sequence numbers in the K packets, where the second sending delay is greater than the first sending delay, and the first sending delay is preset for the first protocol. The receive end sends the acknowledgement ACK message to the transmit end by using the first protocol based on the second sending delay, where the ACK message is used to notify the transmit end that the receive end has received the L packets. The receive end sends the retransmission request for the target packet to the transmit end by using the second protocol (e.g., quasi-TCP protocol), and receives, by using the second protocol, the target packet retransmitted by the transmit end. The foregoing method is used for data transmission, so that the transmit end can be effectively prevented from decreasing a TCP congestion window. In this way, there is no need to use multiple TCP streams to transmit data to ensure throughputs. This solution can not only ensure that the throughputs are high enough and stable, but also greatly lower a memory requirement compared with an improved technology that uses the TCP streams to transmit data, thereby saving system resources.

In one embodiment, before the determining a second sending delay based on a target packet, the method may further include:

determining whether a sequence number corresponding to the last byte of a first packet in the K packets is continuous with a sequence number corresponding to the first byte of a second packet in the K packets, where the first packet is received before the second packet; and determining that no packet is lost if the sequence number corresponding to the last byte of the first packet is continuous with the sequence number corresponding to the first byte of the second packet; or determining that at least one packet is lost if the sequence number corresponding to the last byte of the first packet is not continuous with the sequence number corresponding to the first byte of the second packet, where the at least one packet is the target packet.

A method for determining whether a packet is lost is provided in this embodiment and is as follows: The first packet is received before the second packet. It is assumed that a length of the first packet is 10 bytes, and each byte is corresponding to one sequence number. To be specific, sequence numbers of the 10 bytes of the first packet are respectively 1, 2, 3, 4, 5, 6, 7, 8, 9, and 10. Therefore, after the first packet is received, it may be obtained that the sequence number corresponding to the last byte of the first packet is 10.

After the first packet is received, the second packet is subsequently received. In this case, the second packet needs to be parsed to obtain the sequence number corresponding to the first byte of the second packet. If the sequence number corresponding to the first byte is 11, it indicates that the second packet is continuous with the first packet, that is, it is determined that no packet is lost. If the sequence number corresponding to the first byte of the second packet is not 11, it indicates that the second packet is not continuous with the first packet, that is, it is determined that at least one packet is lost, and the at least one lost packet is the target packet.

In addition, a method for determining whether a packet is lost is provided in this embodiment of the present invention. It may be determined whether a packet is lost by determining whether the sequence number corresponding to the last byte of the first packet in the K packets is continuous with the sequence number corresponding to the first byte of the second packet in the K packets. The lost packet is determined by using the foregoing method. If no packet is lost, there is no need to increase the second sending delay. If it is determined that a target packet is lost by using the foregoing method, the second sending delay may be further increased. Therefore, it may be more accurately learned, by determining whether the target packet is lost, whether the second sending delay needs to be increased, so as to improve feasibility and practicality of the solution.

In one embodiment, before the sending a retransmission request for the target packet to the transmit end by using a second protocol, the method may further include:

sending information about the target packet to a second protocol layer of the second protocol by a first protocol layer of the first protocol.

In this embodiment, before sending the retransmission request for the target packet to the transmit end by using the second protocol, the receive end needs to first send related information about the target packet to the second protocol at the receive end by using the first protocol at the receive end. The related information about the target packet includes an offset and a length of a lost packet. The offset refers to an offset location of the lost packet in an entire data stream, and the length refers to a quantity of bytes in the packet. It may be understood that the information about the target packet may further include some other information.

Figure 2:
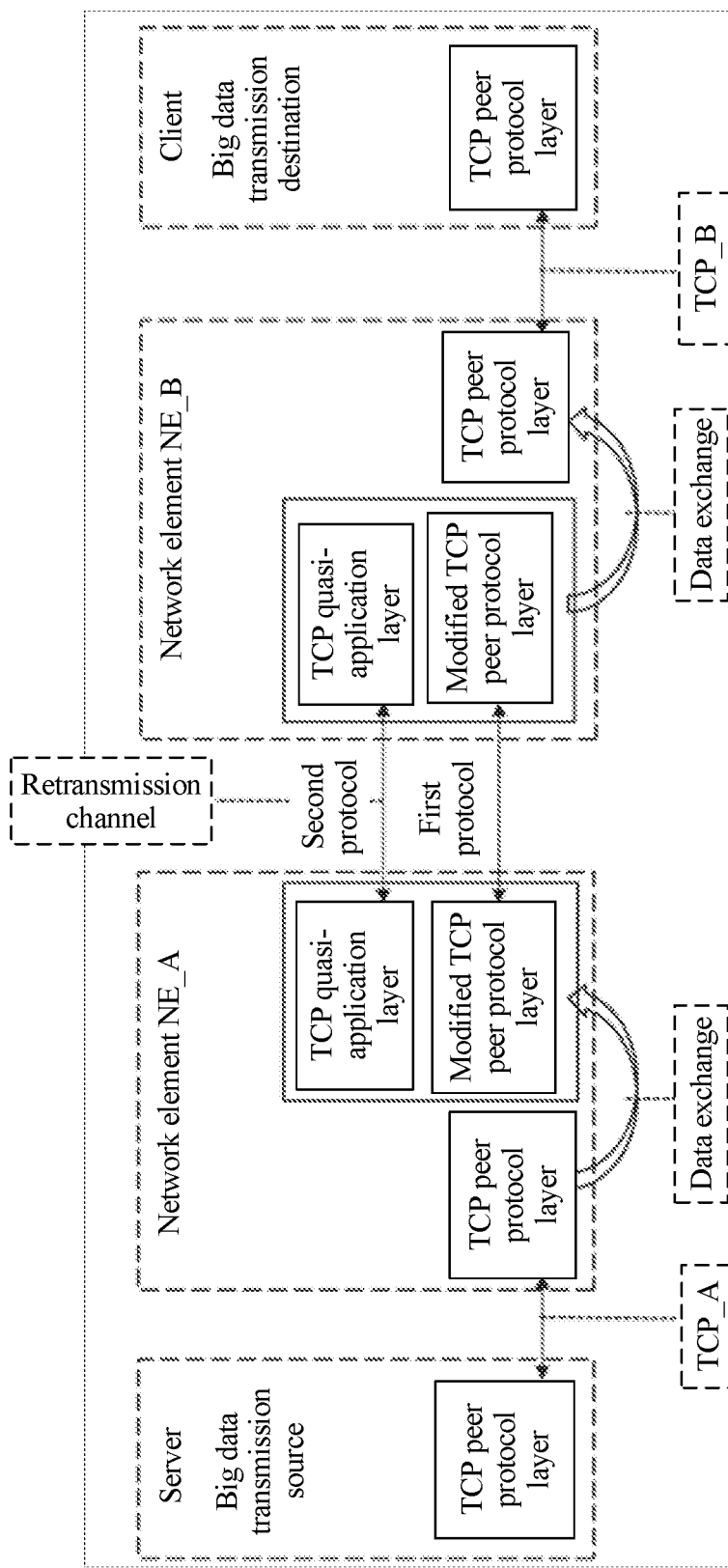
FIG. 2 is a schematic diagram of a process of interaction between a first protocol and a second protocol according to an embodiment of the present invention.

Refer to FIG. 2 for details about that the receive end sends the information about the target packet to the second protocol at the receive end by using the first protocol. FIG. 2 is a schematic diagram of a process of interaction between a first protocol and a second protocol according to an embodiment of the present invention. As shown in FIG. 2, two TCP/IP protocol stacks are deployed on a network element (NE). Data transmission is divided into three parts: from a server to an NE_A, from the NE_A to an NE_B, and from the NE_B to a client. An existing standard TCP/IP protocol stack is used in a TCP_A and a TCP_B. There are many methods for data exchange between NE devices, for example, sharing memory and messages. A TCP proxy may be disposed between the server and the client to communicate by using the NE. The NE_A may send data to the NE_B while obtaining the data from the server. The NE_B may send data to the client while receiving the data from the NE_A.

The TCP_A (e.g., the TCP protocol handed by the TCP peer protocol layer of NE_A) and the TCP_B (e.g., the TCP protocol handed by the TCP peer protocol layer of NE_B) are existing TCP protocols. The server and the NE_A transmit data at a TCP peer protocol layer by using the existing TCP protocol. The NE_B and the client transmit data at a TCP peer protocol layer by using the existing TCP protocol. The NE_A and the NE_B separately modify the existing TCP protocol to obtain the first protocol (e.g., the modified TCP peer protocol layers of NE_A and NE_B) and the second protocol (the TCP quasi-application layers of NE_A and NE_B). A packet is sent, by using an application layer, at a TCP peer protocol layer at the transmit end, to a TCP layer that uses the first protocol. Similarly, a packet is sent, by using an application layer, at a TCP peer protocol layer at the receive end, to the TCP layer that uses the first protocol. The receive end sends an acknowledgement ACK message to the transmit end by using the first protocol, and the transmit end sends, by using the second protocol, a target packet required for retransmission to the receive end.

In the solution of the present invention, the NE_A is a transmit end on a server side, and the NE_B is a receive end on a client side. The receive end is used as an example for description. That the receive end sends information about the target packet to the second protocol at the receive end by using the first protocol at the receive end may be specifically as follows: The receive end obtains a sequence number corresponding to the first byte of the target packet, a length of the target packet, and an offset location of the target packet by using the first protocol through calculation, and sends the information about the target packet to a second protocol layer of the second protocol by a first protocol layer of the first protocol.

In addition, a relationship between the first protocol and the second protocol is specifically described in this embodiment of the present invention. Data exchange is performed between the first protocol and the second protocol at the receive end or the transmit end. The first protocol mainly implements that sending of the acknowledgement ACK message can be delayed in a case of a packet loss, and the second protocol is used between the transmit end and the receive end to complete effective data transmission in a cooperation manner, and is responsible for retransmission of the lost packet. The newly-added second protocol plays a role in improving packet retransmission efficiency in an actual application process, and the data exchange between the first protocol and the second protocol provides support for specific implementation of the solution of the present invention, thereby improving feasibility and practicality of the solution.

In one embodiment, after the determining that at least one packet is lost, the method may further include:

determining a location of the target packet by using the second protocol based on an initial sequence number of the first protocol, the sequence number corresponding to the last byte of the first packet, and the sequence number corresponding to the first byte of the second packet.

A method for determining a location of a target packet in an entire to-be-sent data stream is provided in this embodiment. The receive end may receive, by using the first protocol, packets sent by the transmit end, and determine whether a packet in these packets is lost. After determining that at least one packet is lost, the receive end may obtain the initial sequence number of the first protocol, that is, a sequence number of the first byte of a packet that is sent for the first time to the receive end by the transmit end by using the first protocol, and obtain the sequence number corresponding to the last byte of the first packet and the sequence number corresponding to the first byte of the second packet through parsing. The first packet is received before the second packet. The receive end may obtain an offset location of the lost packet in an entire data stream through calculation based on the initial sequence number and the sequence number corresponding to the last byte of the first packet. The receive end may further obtain a length of the lost packet, namely, a quantity of bytes, through calculation based on the sequence number corresponding to the last byte of the first packet and the sequence number corresponding to the first byte of the second packet.

In one embodiment, if a quantity of to-be-transmitted packets is relatively small, a sequence of each packet may be directly marked with a sequence number. However, for big data transmission, a quantity of packets usually is relatively large. Generally, a sequence number of a packet that is transmitted by using the TCP is limited. A largest sequence number is $(2^{32}-1)$, and an initial sequence number is any positive integer from 0 to $(2^{32}-1)$. When a sequence number is greater than $(2^{32}-1)$, a loop count of a sequence number needs to be set. For example, when an actual sequence number is $(2^{32}+1)$, it means that the actual sequence number exceeds a range of $(2^{32}-1)$. Therefore, the loop count of the sequence number is set to "1" to indicate that a loop ends. An expression of the actual sequence number may be obtained by subtracting the largest sequence number from the actual sequence number and then subtracting 1. $(2^{32}+1)$ may be represented as 1_1. The first "1" in 1_1 indicates that one loop ends, and the second "1" indicates that a location occupied in a new loop is the second location because there is still a prior location whose sequence number is "0".

During big data transmission, a case in which the sequence number is greater than the largest sequence number may be processed by adding the loop count of the sequence number, so that feasibility of the solution in actual application is improved, and the location of the target packet can be more accurately obtained through calculation.

It should be noted that in addition to using a method for adding the loop count of the sequence number to calculate the sequence number of the packet, the largest sequence number carried in the packet may be increased by improving a protocol.

So far, the receive end uses the first protocol at the TCP layer to send, to a TCP quasi-application layer, information such as an offset location and a length of a packet in an entire to-be-sent data stream that are obtained through calculation, and uses the second protocol at the TCP quasi-application layer to obtain a specific location of the lost target packet based on the foregoing information, so as to retransmit the target packet.

In addition, in this embodiment of the present invention, the receive end may send the information to a second protocol layer of the second protocol by a first protocol layer of the first protocol based on the initial sequence number, the sequence number corresponding to the last byte of the first packet, and the sequence number corresponding to the first byte of the second packet, so that the receive end determines the location of the target packet in the entire to-be-sent data stream by using the second protocol. Therefore, the solution is more feasible, and is more practical and flexible.

In one embodiment, the determining a location of the target packet by using the second protocol based on an initial sequence number of the first protocol, the sequence number corresponding to the last byte of the first packet, and the sequence number corresponding to the first byte of the second packet may include:

calculating a sequence number corresponding to the first byte of the target packet based on a formula M=A+1, where M is the first byte corresponding to the target packet, and A is the sequence number corresponding to the last byte of the first packet;

calculating a length of the target packet based on a formula N=B−A−1, where

N is the length of the target packet, B is the sequence number corresponding to the first byte of the second packet; and calculating an offset location of the target packet based on a formula Q=A−Y, where Q is the offset location of the target packet, Y is the initial sequence number.

A formula for determining the location of the target packet is provided in this embodiment and is as follows:

(1) Calculate the first byte corresponding to the target packet based on the formula M=A+1.

M is the first byte corresponding to the target packet. A is the sequence number corresponding to the last byte of the first packet, and it is assumed that A is 20099. In this case, M is 20099+1=20100 because the target packet is a lost packet between the first packet and the second packet, and the first byte of the target packet is continuous with the last byte of the first packet.

(2) Calculate the length of the target packet based on the formula N=B−A−1.

N is the length of the target packet. B is the sequence number corresponding to the first byte of the second packet, and it is assumed that B is 21100. A is the sequence number corresponding to the last byte of the first packet, and it is assumed that A is 20099. In this case, N is 21100−20099−1=1000 because the first packet is separated from the second packet by the target packet. Therefore, a length of bytes in the target packet is obtained by subtracting the sequence number corresponding to the last byte of the first packet from the sequence number corresponding to the first byte of the second packet and then subtracting 1.

(3) Calculate the offset location of the target packet based on the formula Q=A−Y.

Q is the offset location of the target packet. A is the sequence number corresponding to the last byte of the first packet, and it is assumed that A is 20099. Y is the initial sequence number, and it is assumed that Y is 99. In this case, Q is 20099−99=20000 because the offset location is a start location of the target packet. The location of the target packet may be learned by subtracting the initial sequence number from the sequence number corresponding to the last byte of the first packet.

Further, how to determine the location of the target packet by using the second protocol is described in this embodiment of the present invention. The receive end may calculate the first byte corresponding to the target packet, the length of the target packet, and the offset location of the target packet based on related formulas, so as to determine the location of the target packet, thereby providing a specific basis for implementation of the solution, and improving feasibility of the solution.

Optionally, based on any one of FIG. 1, or the first to the fourth optional embodiments corresponding to FIG. 1, in a fifth optional embodiment of the data transmission method provided in this embodiment of the present invention, after the determining a second sending delay based on a target packet, the method may further include:

starting a counter; and each time one packet is received, determining whether a packet loss occurs; and if a packet is lost, resetting the counter, and increasing the second sending delay, or if no packet is lost, increasing a value of the counter, and determining whether the value of the counter reaches a preset threshold; and if the value of the counter reaches the preset threshold, decreasing the second sending delay, and resetting the counter.

In this embodiment, the receive end may control the second sending delay based on an actual situation after determining the second sending delay based on the target packet.

Figure 3:
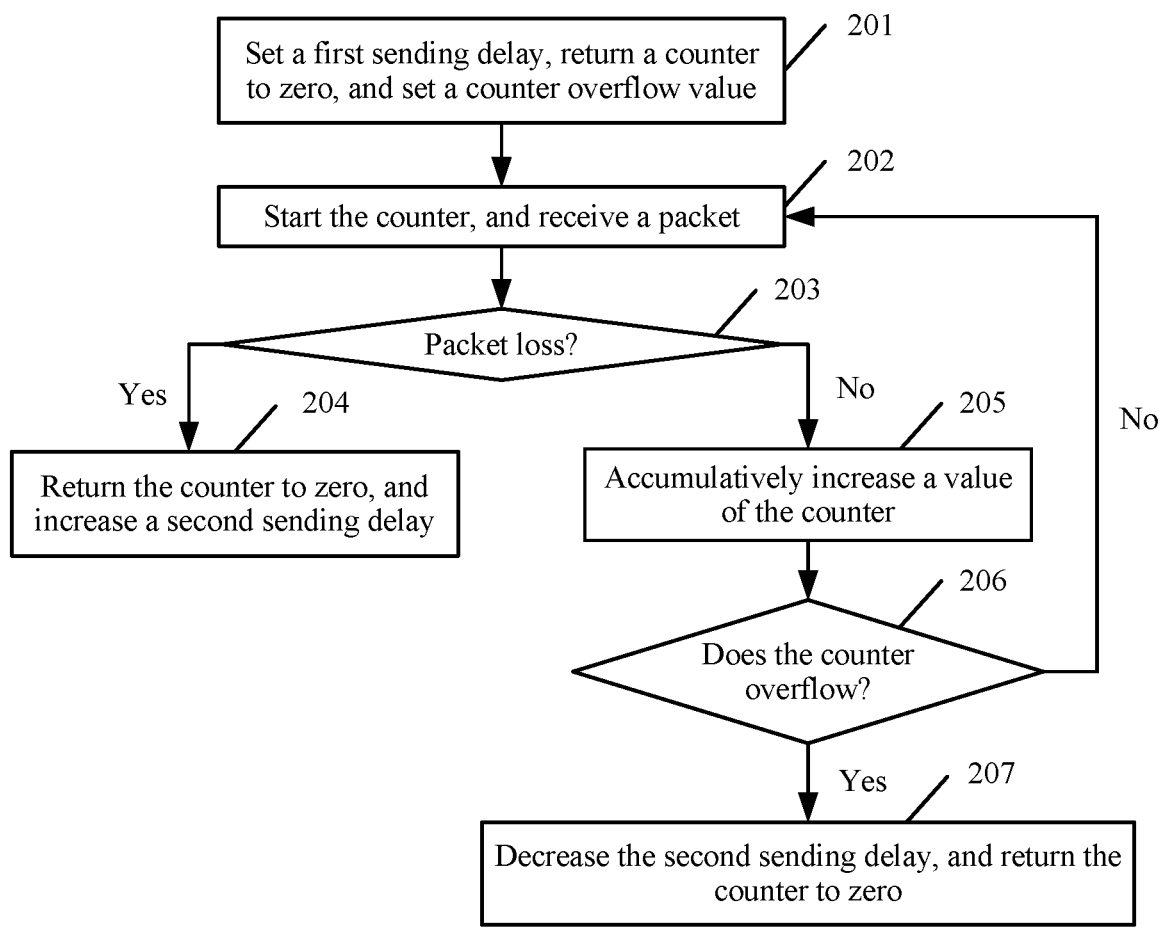
FIG. 3 is a schematic flowchart of controlling a second sending delay by a receive end according to an embodiment of the present invention.

Specifically, referring to FIG. 3, FIG. 3 is a schematic flowchart of controlling a second sending delay by a receive end according to an embodiment of the present invention. As shown in FIG. 3, the following operations are included:

Operation 201: A user sets a first sending delay, returns a counter to zero, and sets a counter overflow value.

For example, the user sets the first sending delay based on an actual situation, that is, an ACK delay initial value is 8 milliseconds, then returns the counter to zero, and finally sets the counter overflow value to 100, namely, a preset threshold is 100. To be specific, the counter overflows when a quantity of non-lost packets is greater than or equal to 100.

Operation 202: Start the counter, and start receiving a packet sent by a transmit end, where the counter is used to calculate a quantity of packets.

Operation 203: Determine whether a packet is lost.

Each time receiving one packet, the receive end needs to determine whether a packet loss occurs. A determining method is like the process described in the first optional embodiment corresponding to FIG. 1. To be specific, the receive end determines whether a packet is lost by determining whether a sequence number corresponding to the last byte of a first packet is continuous with a sequence number corresponding to the first byte of a second packet.

Operation 204: When it is determined that a packet is lost, reset the counter and increase a second sending delay.

If the sequence number corresponding to the last byte of the first packet is not continuous with the sequence number corresponding to the first byte of the second packet, it is determined that a packet is lost. In this case, the counter needs to be reset and the second sending delay needs to be increased. One fixed value, such as 20 ms, is increased each time. When one packet is lost, the second sending delay is 28 ms (ACK delay initial value+1×Fixed value). Certainly, if two packets are continuously lost, the second sending delay is 48 ms (ACK delay initial value+2×Fixed value), and so on. The second sending delay is calculated in the foregoing manner.

Operation 205: Accumulatively increase a value of a non-packet loss counter when it is determined that no packet is lost.

If the sequence number corresponding to the last byte of the first packet is continuous with the sequence number corresponding to the first byte of the second packet, it is determined that no packet is lost. In this case, a value of the counter needs to be accumulatively increased. For example, for a counter returned to zero, when it is determined that the first received packet is not lost, the value of the counter is 1, when the second packet is not lost either, the value of the counter is accumulatively increased to 2, and so on. The value of the counter is accumulatively increased in the foregoing manner.

Operation 206: Determine whether the counter overflows, that is, determine whether the value of the counter reaches a preset threshold.

Whether the value of the counter reaches the preset threshold needs to be determined each time the value of the counter is accumulatively increased. It may be learned that the counter overflow value is 100 based on operation 201, that is, the preset threshold is 100. If the accumulatively increased value of the counter reaches the preset threshold, operation 207 is performed; or if the accumulatively increased value of the counter is less than the preset threshold, operation 202 is performed to continue to receive a next packet.

Operation 207: When the counter overflows, decrease the second sending delay, and return the counter to zero.

If the accumulatively increased value of the counter reaches the preset threshold, it is assumed that the accumulatively increased value of the counter is just 100, the second sending delay needs to be decreased. Each time 100 is reached, the second sending delay may be decreased based on a second fixed value, such as 1 ms, the counter is reset, that is, the counter is returned to zero, and operation 202 is performed to continue to receive a subsequent packet.

It should be noted that the first sending delay, a size of a fixed value increased each time, the preset threshold of the counter, and a size of the second fixed value in this embodiment may be set based on an actual situation.

Still further, in this embodiment of the present invention, the receive end may control the second sending delay based on an actual situation. The receive end increases the second sending delay when determining that a packet is lost, so as to avoid a problem that because the receive end sends an ACK message to the transmit end once detecting a packet loss, a congestion window at the transmit end is halved. The receive end decreases the second sending delay when determining that no packet is lost, so that the transmit end can learn of a receiving status of the receive end in a more timely manner. In this way, because the congestion window at the transmit end is not suddenly decreased, throughputs can be ensured when the TCP is used to transmit data. In addition, the receive end controls the second sending delay by using a method for calculating a quantity of packets by using the counter, so that feasibility and flexibility of the solution can be improved.

Figure 4:
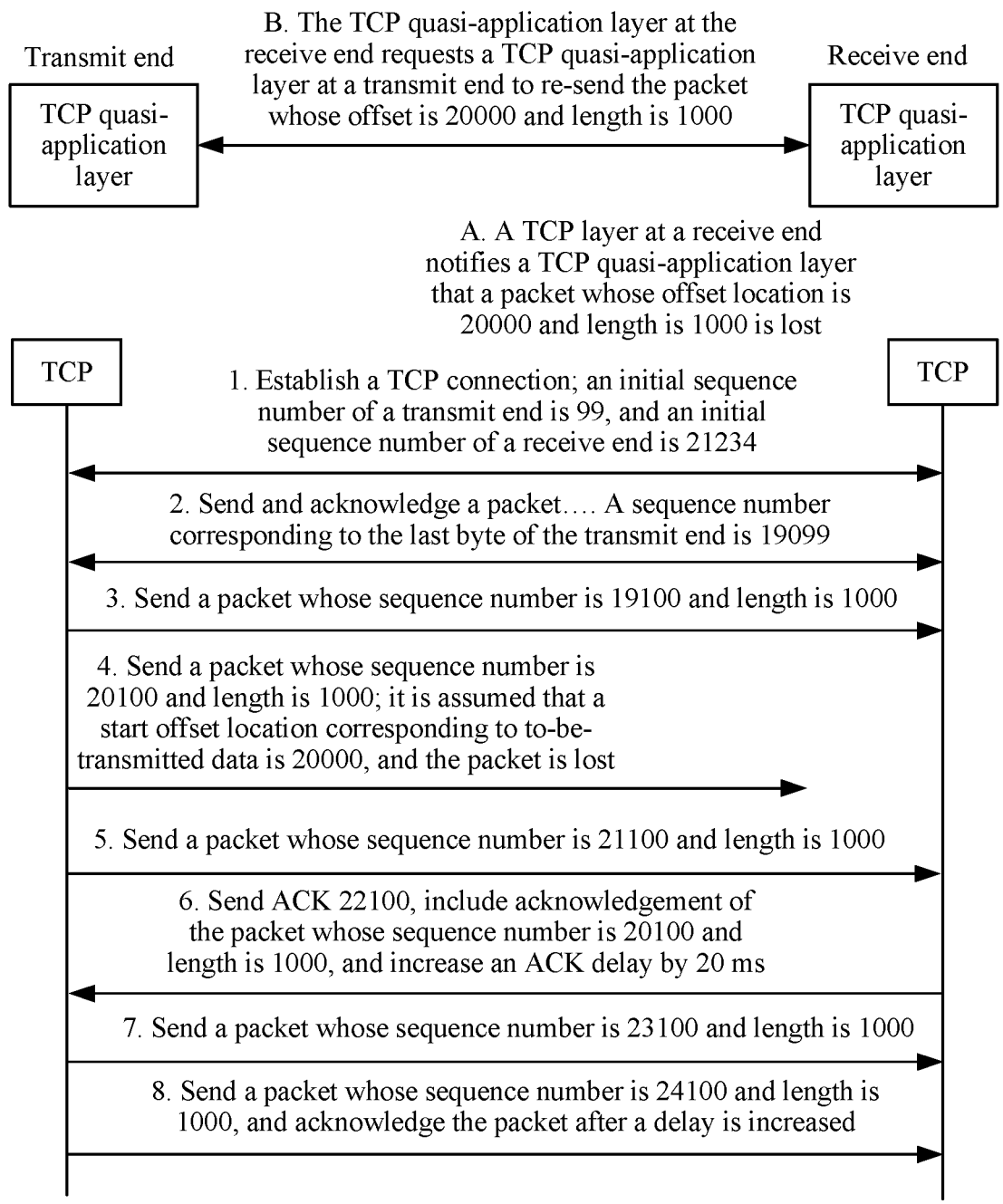
FIG. 4 shows a data transmission application scenario according to an embodiment of the present invention.

For ease of understanding, the following describes in detail a data transmission method in the present invention by using a specific application scenario. Referring to FIG. 4, FIG. 4 is a data transmission application scenario according to an embodiment of the present invention. The data transmission application scenario is as follows:

Operation 1. Establish a TCP connection between a TCP layer at a transmit end and a TCP layer at a receive end. It is assumed that an initial sequence number of the transmit end is 99, and an initial sequence number of the receive end is 21234.

Operation 2. Perform data exchange between the transmit end and the receive end. The transmit end sends a packet, and the receive end acknowledges the received packet. The packet is sent from the transmit end and received by the receive end. If no packet is lost in this process, a sequence number corresponding to the last byte of the packet sent by the transmit end is 19099.

Operation 3. The transmit end sends a packet whose sequence number is 19100 and length is 1000 to the TCP layer at the receive end by using a TCP layer that uses a first protocol. An offset location of the first byte of the packet is 19000 (that is, 19099−99=19000), and a sequence number corresponding to the last byte of the packet sent by the transmit end is 20099.

Operation 4. The transmit end sends a packet whose sequence number is 20100 and length is 1000 by using the first protocol at the TCP layer. An offset location of the first byte of the packet is 20000, and it is assumed that the packet is lost in a transmission process.

Operation 5. The transmit end sends a packet whose sequence number is 21100 and length is 1000 by using the first protocol at the TCP layer. An offset location of the first byte of the packet is 21000, and the packet is received by the receive end.

Operation A. If the receive end detects that sequence numbers of received packets are no longer continuous, the TCP layer at the receive end may determine that a packet is lost in this case, and may obtain a sequence number and a length of the lost packet based on a sequence number of the last byte of a previous packet and a sequence number corresponding to the first byte of a currently received packet. If the sequence number of the last byte of the previous packet is 20099, a sequence number corresponding to the first byte of the lost packet is 20099+1=20100, the length of the lost packet is 21100−20099−1=1000, and an offset location of the first byte of the lost packet is 20099−99=20000. The TCP layer at the receive end reports the information to a TCP quasi-application layer.

Operation B: The TCP layer at the receive end increases a second sending delay, and the TCP quasi-application layer at the receive end initiates a retransmission request to a TCP quasi-application layer at the transmit end. Information carried in the request is that the offset location of the first byte of the lost packet is 20000, and the length of the lost packet is 1000.

Operations 6-8. Packet sending, receiving, and acknowledgement continue between the TCP layer at the receive end and the TCP layer at the transmit end.

Figure 5:
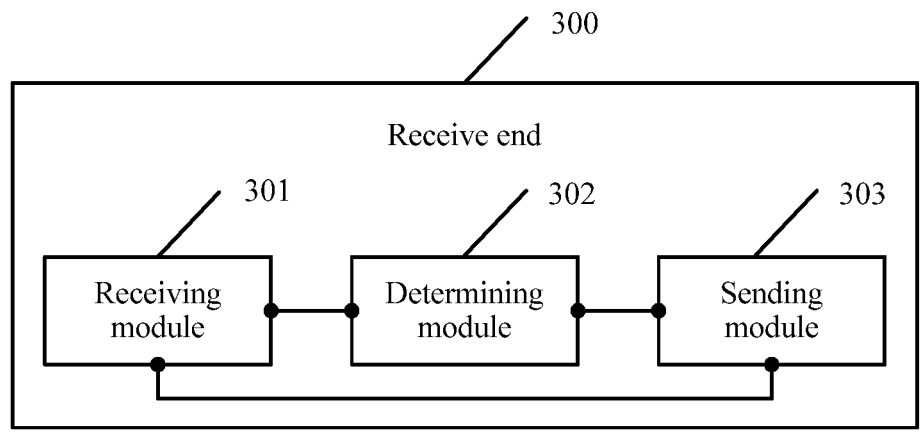
FIG. 5 is a schematic diagram of an embodiment of a receive end according to an embodiment of the present invention.

The following describes in detail a receive end in the present invention. Referring to FIG. 5, a receive end 300 in an embodiment of the present invention includes:

a receiving module 301, configured to receive, by using a first protocol, K packets sent by a transmit end, where each packet includes a sequence number, and the K packets are a subset of L packets sent by the transmit end;

a determining module 302, configured to determine a second sending delay based on a target packet when detecting that the target packet is lost by using the first protocol based on sequence numbers in the K packets received by the receiving module 301, where the second sending delay is greater than a first sending delay, and the first sending delay is preset; and a sending module 303, configured to send an acknowledgement ACK message to the transmit end by using the first protocol based on the second sending delay determined by the determining module 302, where the acknowledgement ACK message is used to notify the transmit end that the receive end has received the L packets.

The sending module 303 is further configured to send a retransmission request for the target packet to the transmit end by using a second protocol when the determining module 302 detects that the target packet is lost by using the first protocol based on the sequence numbers in the K packets.

The receiving module 301 is further configured to: after the sending module 303 sends the retransmission request for the target packet to the transmit end by using the second protocol, receive, by using the second protocol, the target packet retransmitted by the transmit end.

In this embodiment, the receiving module 301 receives, by using the first protocol, the K packets sent by the transmit end, where each received packet includes a sequence number, and the K packets are some of the L packets sent by the transmit end. The determining module 302 determines the second sending delay based on the target packet when detecting that the target packet is lost by using the first protocol based on the sequence numbers in the K packets received by the receiving module 301, where the second sending delay is greater than the first sending delay, and the first sending delay is preset. The sending module 303 sends the acknowledgement ACK message to the transmit end by using the first protocol based on the second sending delay determined by the determining module 302, where the acknowledgement ACK message is used to notify the transmit end that the receive end has received the L packets. The sending module 303 sends the retransmission request for the target packet to the transmit end by using the second protocol when the determining module 302 detects that the target packet is lost by using the first protocol based on the sequence numbers in the K packets. After the sending module 303 sends the retransmission request for the target packet to the transmit end by using the second protocol, the receiving module 301 receives, by using the second protocol, the target packet retransmitted by the transmit end.

The present invention provides the data transmission method that may be applied to a big data scenario. The receive end receives, by using the first protocol, the K packets sent by the transmit end, where each packet includes a sequence number, and the K packets are some of the L packets sent by the transmit end. The receive end determines the second sending delay based on the target packet when detecting that the target packet is lost by using the first protocol based on the sequence numbers in the K packets, where the second sending delay is greater than the first sending delay, and the first sending delay is preset. The receive end sends the acknowledgement ACK message to the transmit end by using the first protocol based on the second sending delay, where the ACK message is used to notify the transmit end that the receive end has received the L packets. The receive end sends the retransmission request for the target packet to the transmit end by using the second protocol, and receives, by using the second protocol, the target packet retransmitted by the transmit end. The foregoing method is used for data transmission, so that the transmit end can be effectively prevented from decreasing a TCP congestion window. In this way, there is no need to use multiple TCP streams to transmit data to ensure throughputs. This solution can not only ensure that the throughputs are high enough and stable, but also greatly lower a memory requirement compared with an improved technology that uses the TCP streams to transmit data, thereby saving system resources.

Figure 6:
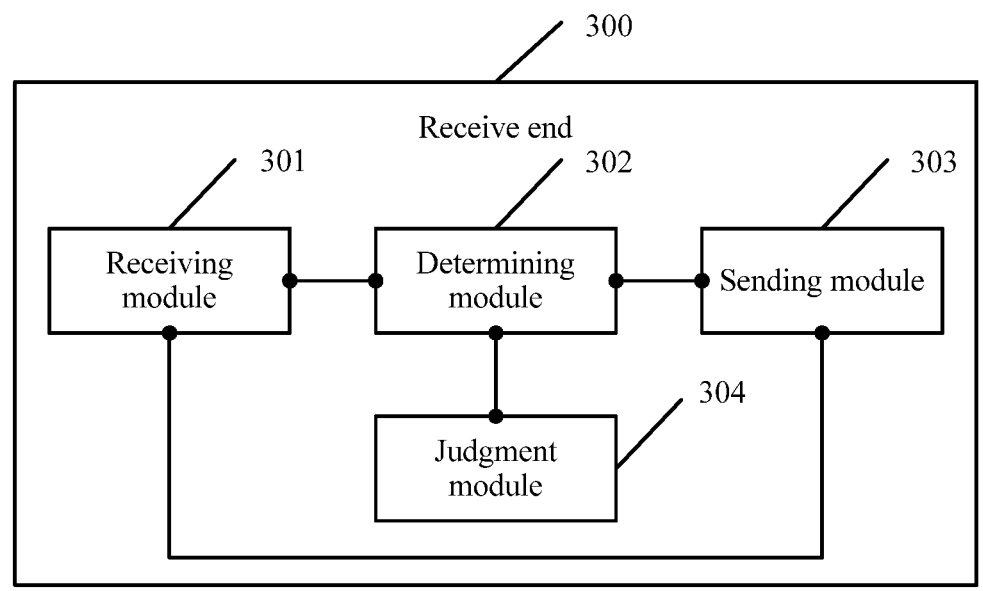
FIG. 6 is a schematic diagram of another embodiment of a receive end according to an embodiment of the present invention.

Optionally, based on the embodiment corresponding to FIG. 5, referring to FIG. 6, in another embodiment of the receive end provided in this embodiment of the present invention, the receive end 300 further includes a judgment unit 304.

The judgment module 304 is configured to: before the determining module 302 determines a sending delay based on the target packet, determine whether a sequence number corresponding to the last byte of a first packet in the K packets is continuous with a sequence number corresponding to the first byte of a second packet in the K packets, where the first packet is received before the second packet.

The determining module 302 is further configured to: determine that no packet is lost if the judgment module 304 determines that the sequence number corresponding to the last byte of the first packet is continuous with the sequence number corresponding to the first byte of the second packet; or determine that at least one packet is lost if the judgment module 304 determines that the sequence number corresponding to the last byte of the first packet is not continuous with the sequence number corresponding to the first byte of the second packet, where the at least one packet is the target packet.

In addition, a method for determining whether a packet is lost is provided in this embodiment of the present invention. It may be determined whether a packet is lost by determining whether the sequence number corresponding to the last byte of the first packet in the K packets is continuous with the sequence number corresponding to the first byte of the second packet in the K packets. The lost packet is determined by using the foregoing method. If no packet is lost, there is no need to increase the second sending delay. If it is determined that a target packet is lost by using the foregoing method, the second sending delay may be further increased. Therefore, it may be more accurately learned, by determining whether the target packet is lost, whether the second sending delay needs to be increased, so as to improve feasibility and practicality of the solution.

In one embodiment, the sending module 303 is further configured to: before the sending module 303 sends the retransmission request for the target packet to the transmit end by using the second protocol, send information about the target packet to a second protocol layer (e.g., TCP quasi-application layer) of the second protocol by a first protocol layer (e.g., modified TCP peer protocol layer) of the first protocol.

In addition, a relationship between the first protocol and the second protocol is described in this embodiment of the present invention. Data exchange is performed between the first protocol and the second protocol at the receive end or the transmit end. The first protocol mainly implements that sending of the ACK message can be delayed in a case of a packet loss, and the second protocol is used between the transmit end and the receive end to complete effective data transmission in a cooperation manner, and is responsible for retransmission of the lost packet. The newly-added second protocol plays a role in improving packet retransmission efficiency in an actual application process, and the data exchange between the first protocol and the second protocol provides support for specific implementation of the solution of the present invention, thereby improving feasibility and practicality of the solution.

In one embodiment, the determining module 302 is further configured to: after the determining module 302 determines that the at least one packet is lost, determine a location of the target packet by using the second protocol based on an initial sequence number of the first protocol, the sequence number corresponding to the last byte of the first packet, and the sequence number corresponding to the first byte of the second packet.

In addition, in this embodiment of the present invention, the receive end may send the information to a second protocol layer (e.g., TCP quasi-application layer) of the second protocol by a first protocol layer (e.g., modified TCP peer protocol layer) of the first protocol based on the initial sequence number, the sequence number corresponding to the last byte of the first packet, and the sequence number corresponding to the first byte of the second packet, so that the receive end determines the location of the target packet in an entire to-be-sent data stream by using the second protocol. Therefore, the solution is more feasible, and is more practical and flexible.

Figure 7:
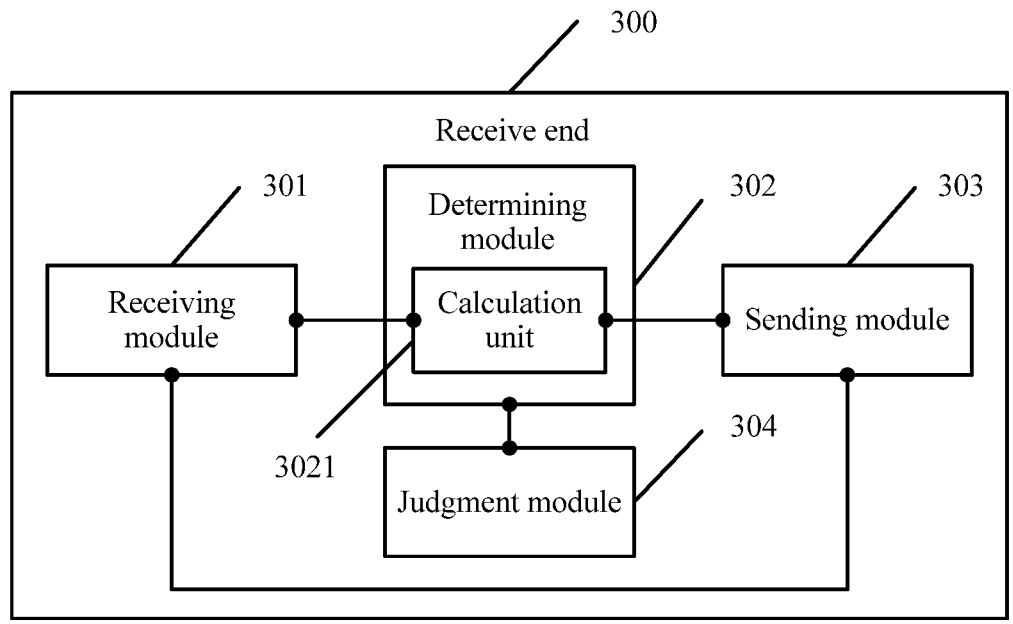
FIG. 7 is a schematic diagram of another embodiment of a receive end according to an embodiment of the present invention.

Optionally, based on the second embodiment corresponding to FIG. 6, referring to FIG. 7, in another embodiment of the receive end provided in this embodiment of the present invention, the determining module 302 includes:

a calculation unit 3021, configured to: calculate the first byte corresponding to the target packet based on a formula $M=A+1$, where M is the first byte corresponding to the target packet, and A is the sequence number corresponding to the last byte of the first packet;

calculate a length of the target packet based on a formula $N=B-A-1$, where

N is the length of the target packet, B is the sequence number corresponding to the first byte of the second packet, and A is the sequence number corresponding to the last byte of the first packet; and calculate a location of the target packet based on a formula $Q=A-Y$, where Q is the location of the target packet, A is the sequence number corresponding to the last byte of the first packet, and Y is the initial sequence number.

Further, how to determine the location of the target packet by using the second protocol is described in this embodiment of the present invention. The receive end may calculate the first byte corresponding to the target packet, the length of the target packet, and the offset location of the target packet based on related formulas, so as to determine the location of the target packet, thereby providing a specific basis for implementation of the solution, and improving feasibility of the solution.

Figure 8:
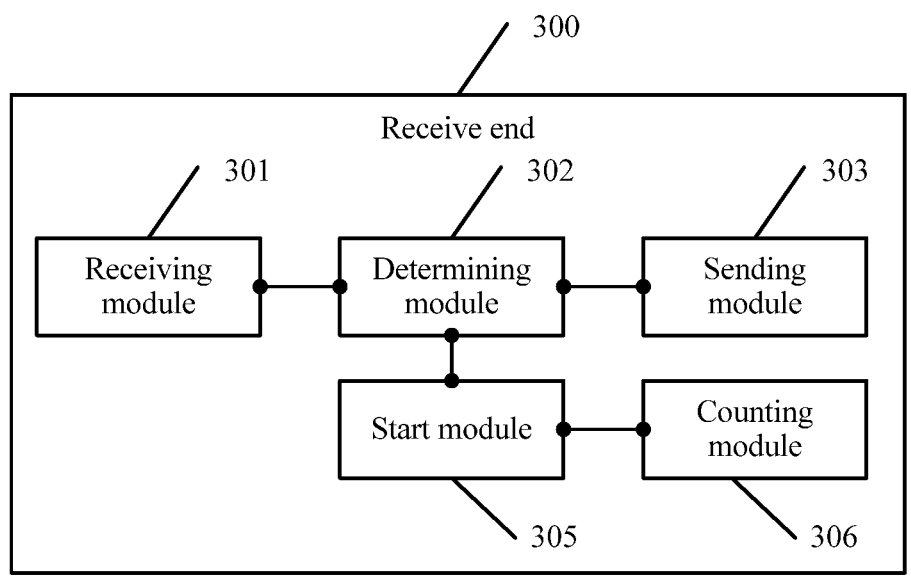
FIG. 8 is a schematic diagram of another embodiment of a receive end according to an embodiment of the present invention.

Optionally, based on the embodiment corresponding to FIG. 5, FIG. 6, or FIG. 7, referring to FIG. 8, in another embodiment of the receive end provided in this embodiment of the present invention, the receive end 300 further includes a start module 305 and a counting module 306.

The start module 305 is configured to start a counter after the determining module 302 determines the second sending delay based on the target packet.

The counting module 306 is configured to: after the start module 305 starts the counter, each time one packet is received, determine whether a packet loss occurs; and if a packet is lost, reset the counter, and increase the second sending delay, or if no packet is lost, increase a value of the counter, and determine whether the value of the counter reaches a preset threshold; and if the value of the counter reaches the preset threshold, decrease the second sending delay, and reset the counter.

Figure 9:
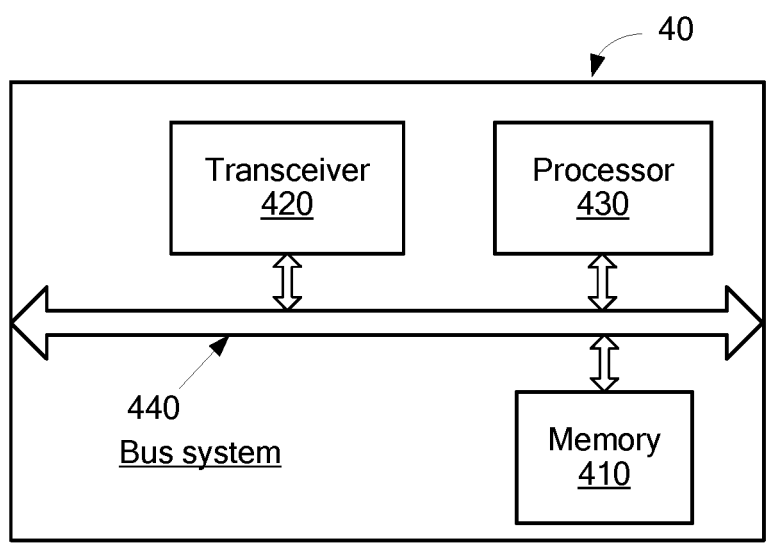
FIG. 9 is a schematic structural diagram of hardware of a receive end according to an embodiment of the present invention.

FIG. 9 is a schematic structural diagram of a receive end 40 according to an embodiment of the present invention. The receive end 40 may include a memory 410, a transceiver 420, a processor 430, and a bus system 440.

The memory 410 may include a read-only memory and a random access memory, and provide an instruction and data for the processor 430. A part of the memory 410 may further include a nonvolatile random access memory (NVRAM).

The memory 410 is configured to store a program instruction.

The processor 430 is configured to execute the program instruction in the memory 410 to implement the following operations:

controlling the transceiver to receive K packets by using a first protocol, where each packet includes a sequence number, and the K packets are a subset of L packets sent by a transmit end;

determining a second sending delay based on a target packet when it is detected that the target packet is lost by using the first protocol based on sequence numbers in the K packets, where the second sending delay is greater than a first sending delay, and the first sending delay is preset;

controlling the transceiver to send an ACK message to the transmit end by using the first protocol based on the second sending delay, where the ACK message is used to notify the transmit end that the receive end has received the L packets;

controlling the transceiver to send a retransmission request for the target packet to the transmit end by using a second protocol; and controlling the transceiver to receive, by using the second protocol, the target packet retransmitted by the transmit end.

In this embodiment of the present invention, the processor 430 is further configured to execute the program instruction in the memory 410 to send information about the target packet to a second protocol layer (e.g., TCP quasi-application layer) of the second protocol by a first protocol layer (e.g., modified TCP peer protocol layer) of the first protocol.

The processor 430 controls an operation of the receive end 40, and the processor 430 may be referred to as a central processing unit (CPU). In specific application, all components of the receive end 40 are coupled together by using the bus system 440. In addition to a data bus, the bus system 440 may include a power bus, a control bus, a status signal bus, and the like. However, for clear description, various types of buses in the figure are marked as the bus system 440.

The method disclosed in the foregoing embodiment of the present invention may be applied to the processor 430, or be implemented by the processor 430. The processor 430 may be an integrated circuit chip, and has a signal processing capability. In an implementation process, steps in the foregoing method may be completed by using a hardware integrated logic circuit in the processor 430 or an instruction in a form of software. Optionally, the processor 430 is further configured to:

determine whether a sequence number corresponding to the last byte of a first packet in the K packets is continuous with a sequence number corresponding to the first byte of a second packet in the K packets, where the first packet is received before the second packet; and determine that no packet is lost if the sequence number corresponding to the last byte of the first packet is continuous with the sequence number corresponding to the first byte of the second packet; or determine that at least one packet is lost if the sequence number corresponding to the last byte of the first packet is not continuous with the sequence number corresponding to the first byte of the second packet, where the at least one packet is the target packet.

Optionally, the processor 430 is further configured to:

determine a location of the target packet by using the second protocol based on an initial sequence number of the first protocol, the sequence number corresponding to the last byte of the first packet, and the sequence number corresponding to the first byte of the second packet.

Optionally, the processor 430 is specifically configured to:

calculate a sequence number corresponding to the first byte of the target packet based on a formula $M=A+1$, where M is the first byte corresponding to the target packet, and A is the sequence number corresponding to the last byte of the first packet;

calculate a length of the target packet based on a formula $N=B-A-1$, where

N is the length of the target packet and B is the sequence number corresponding to the first byte of the second packet; and calculate an offset location of the target packet based on a formula $Q=A-Y$, where Q is the offset location of the target packet and Y is the initial sequence number.

Optionally, the processor 430 is further configured to:

start a counter; and each time one packet is received, determine whether a packet loss occurs; and if a packet is lost, reset the counter, and increase the second sending delay, or if no packet is lost, increase a value of the counter, and determine whether the value of the counter reaches a preset threshold; and if the value of the counter reaches the preset threshold, decrease the second sending delay, and reset the counter.

For a related description of FIG. 9, a reference to a related description and an effect of the method part of FIG. 1 for understanding, and details are not described herein.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A data transmission method, comprising:
    receiving K packets using a first protocol, wherein each packet comprises a sequence number, and the K packets are a subset of L packets sent by a transmit end;
    determining a second sending delay based on a target packet when it is detected that the target packet is lost using the first protocol based on sequence numbers in the K packets, wherein the second sending delay is greater than a first sending delay, and the first sending delay is preset;
    sending an acknowledgement (ACK) message to the transmit end using the first protocol based on the second sending delay, wherein the ACK message is used to notify the transmit end that a receive end has received the L packets;
    sending a retransmission request for the target packet to the transmit end using a second protocol; and
    receiving, using the second protocol, the target packet retransmitted by the transmit end.

2. The method according to claim 1, wherein before determining a second sending delay based on a target packet, the method further comprises:
    determining whether a sequence number corresponding to the last byte of a first packet in the K packets is continuous with a sequence number corresponding to the first byte of a second packet in the K packets, wherein the first packet is received before the second packet.

3. The method according to claim 2, further comprising: determining that no packet is lost if the sequence number corresponding to the last byte of the first packet is continuous with the sequence number corresponding to the first byte of the second packet.

4. The method according to claim 2, further comprising: determining that at least one packet is lost if the sequence number corresponding to the last byte of the first packet is not continuous with the sequence number corresponding to the first byte of the second packet, wherein the at least one packet is the target packet.

5. The method according to claim 1, wherein before sending a retransmission request for the target packet to the transmit end using a second protocol, the method further comprises:

sending information about the target packet to a second protocol layer of the second protocol by a first protocol layer of the first protocol.

6. The method according to claim 4, wherein after determining that at least one packet is lost, the method further comprises:
determining a location of the target packet using the second protocol based on an initial sequence number of the first protocol, the sequence number corresponding to the last byte of the first packet, and the sequence number corresponding to the first byte of the second packet.

7. The method according to claim 6, wherein the determining a location of the target packet using the second protocol based on an initial sequence number of the first protocol, the sequence number corresponding to the last byte of the first packet, and the sequence number corresponding to the first byte of the second packet comprises:
calculating a sequence number corresponding to the first byte of the target packet based on a formula M=A+1, wherein
M is the sequence number corresponding to the first byte of the target packet, and A is the sequence number corresponding to the last byte of the first packet;
calculating a length of the target packet based on a formula N=B−A−1, wherein
N is the length of the target packet and B is the sequence number corresponding to the first byte of the second packet; and
calculating an offset location of the target packet based on a formula Q=A−Y, wherein
Q is the offset location of the target packet and Y is the initial sequence number.

8. The method according to claim 1, wherein after the determining a second sending delay based on a target packet, the method further comprises:
starting a counter;
each time one packet is received, determining whether a packet loss occurs;
if a packet is lost, resetting the counter and increasing the second sending delay, or
if no packet is lost,
increasing a value of the counter,
determining whether the value of the counter reaches a preset threshold, and
if the value of the counter reaches the preset threshold, decreasing the second sending delay and resetting the counter.

9. A receive end, comprising:
a processor; and
a non-transitory computer readable medium which contains computer-executable instructions,
wherein the processor is configured to execute the computer-executable instructions to perform operations, the operations comprising:
receiving K packets using a first protocol, wherein each packet comprises a sequence number, and the K packets are a subset of L packets sent by a transmit end;
determining a second sending delay based on a target packet when it is detected that the target packet is lost using the first protocol based on sequence numbers in the K packets, wherein the second sending delay is greater than a first sending delay, and the first sending delay is preset;
sending an acknowledgement (ACK) message to the transmit end using the first protocol based on the second sending delay, wherein the ACK message is used to notify the transmit end that a receive end has received the L packets;
sending a retransmission request for the target packet to the transmit end using a second protocol; and
receiving, using the second protocol, the target packet retransmitted by the transmit end.

10. The receive end according to claim 9, wherein before the determining a second sending delay based on a target packet, the processor is further configured to execute the computer-executable instructions to perform an operation comprising:
determining whether a sequence number corresponding to the last byte of a first packet in the K packets is continuous with a sequence number corresponding to the first byte of a second packet in the K packets, wherein the first packet is received before the second packet.

11. The receive end according to claim 10, wherein the processor is further configured to execute the computer-executable instructions to perform an operation comprising: determining that no packet is lost if the sequence number corresponding to the last byte of the first packet is continuous with the sequence number corresponding to the first byte of the second packet.

12. The receive end according to claim 10, wherein the processor is further configured to execute the computer-executable instructions to perform an operation comprising: determining that at least one packet is lost if the sequence number corresponding to the last byte of the first packet is not continuous with the sequence number corresponding to the first byte of the second packet, wherein the at least one packet is the target packet.

13. The receive end according to claim 9, wherein before the sending a retransmission request for the target packet to the transmit end using a second protocol, the processor is further configured to execute the computer-executable instructions to perform an operation comprising: sending information about the target packet to a second protocol layer of the second protocol by a first protocol layer of the first protocol.

14. The receive end according to claim 12, wherein after the determining that at least one packet is lost, the processor is further configured to execute the computer-executable instructions to perform an operation comprising: determining a location of the target packet by using the second protocol based on an initial sequence number of the first protocol, the sequence number corresponding to the last byte of the first packet, and the sequence number corresponding to the first byte of the second packet.

15. The receive end according to claim 14, wherein the determining a location of the target packet by using the second protocol based on an initial sequence number of the first protocol, the sequence number corresponding to the last byte of the first packet, and the sequence number corresponding to the first byte of the second packet comprises:
calculating a sequence number corresponding to the first byte of the target packet based on a formula M=A+1, wherein
M is the sequence number corresponding to the first byte of the target packet and A is the sequence number corresponding to the last byte of the first packet;
calculating a length of the target packet based on a formula N=B−A−1, wherein
N is the length of the target packet and B is the sequence number corresponding to the first byte of the second packet; and calculating an offset location of the target packet based on a formula Q=A−Y, wherein Q is the offset location of the target packet and Y is the initial sequence number.

16. The receive end according to claim 9, wherein after the determining a second sending delay based on a target packet, the processor is further configured to execute the computer-executable instructions to perform an operation comprising:

starting a counter;
each time one packet is received, determining whether a packet loss occurs;
if a packet is lost, resetting the counter and increasing the second sending delay; and
if no packet is lost,
  increasing a value of the counter,
  determining whether the value of the counter reaches a preset threshold, and
  if the value of the counter reaches the preset threshold, decreasing the second sending delay, and resetting the counter.

17. A receive end, comprising:

a receiving module configured to receive K packets by using a first protocol, wherein each packet comprises a sequence number, and the K packets are a subset of L packets sent by a transmit end;
a determining module configured to determine a second sending delay based on a target packet when detecting that the target packet is lost using the first protocol based on sequence numbers in the K packets received by the receiving module, wherein the second sending delay is greater than a first sending delay, and the first sending delay is preset; and
a sending module configured to send an acknowledgement (ACK) message to the transmit end using the first protocol based on the second sending delay determined by the determining module, wherein the ACK message is used to notify the transmit end that the receive end has received the L packets, wherein
the sending module is further configured to send a retransmission request for the target packet to the transmit end using a second protocol when the determining module detects that the target packet is lost using the first protocol based on the sequence numbers in the K packets; and
the receiving module is further configured to: after the sending module sends the retransmission request for the target packet to the transmit end using the second protocol, receive, using the second protocol, the target packet retransmitted by the transmit end.

18. The receive end according to claim 17, wherein the receive end further comprises a judgment module, wherein the judgment module is configured to:

before the determining module determines the second sending delay based on the target packet,
determine whether a sequence number corresponding to the last byte of a first packet in the K packets is continuous with a sequence number corresponding to the first byte of a second packet in the K packets, wherein the first packet is received before the second packet; and
the determining module is further configured to:
determine that no packet is lost if the judgment module determines that the sequence number corresponding to the last byte of the first packet is continuous with the sequence number corresponding to the first byte of the second packet, or
determine that at least one packet is lost if the judgment module determines that the sequence number corresponding to the last byte of the first packet is not continuous with the sequence number corresponding to the first byte of the second packet, wherein the at least one packet is the target packet.

19. The receive end according to claim 17, wherein the sending module is further configured to: before the sending module sends the retransmission request for the target packet to the transmit end using the second protocol, send information about the target packet to a second protocol layer of the second protocol by a first protocol layer of the first protocol.

20. The receive end according to claim 18, wherein the determining module is further configured to: after the determining module determines that the at least one packet is lost, determine a location of the target packet using the second protocol based on an initial sequence number of the first protocol, the sequence number corresponding to the last byte of the first packet, and the sequence number corresponding to the first byte of the second packet.

21. The method of claim 1, wherein the second sending delay is increased in response to a detected packet loss, and is decreased in response to continuously receiving a predetermined number of packets without packet loss.

* * * * *